INVENTOR.
MELTON G. RABON
BY
ATTORNEY

Feb. 28, 1967　　　　　M. G. RABON　　　　　3,306,325
MACHINE FOR PROCESSING WOODEN PIPE RESTS AND THE LIKE
Filed July 9, 1964　　　　　　　　　　　　　　　4 Sheets-Sheet 2

INVENTOR.
MELTON G. RABON

BY

*B. P. Fishburn, Jr.*
ATTORNEY

Feb. 28, 1967    M. G. RABON    3,306,325
MACHINE FOR PROCESSING WOODEN PIPE RESTS AND THE LIKE
Filed July 9, 1964    4 Sheets-Sheet 3
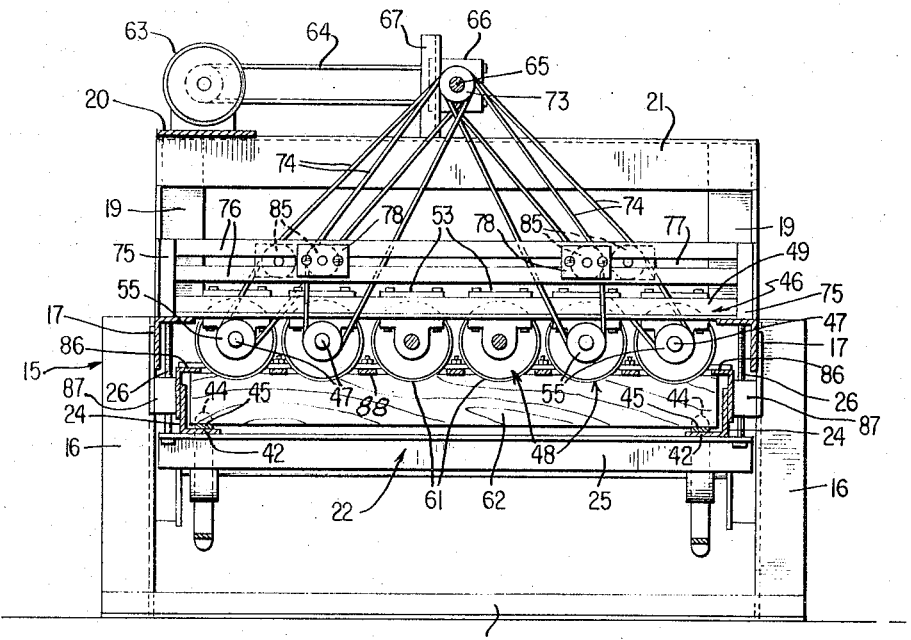
FIG. 3
FIG. 4
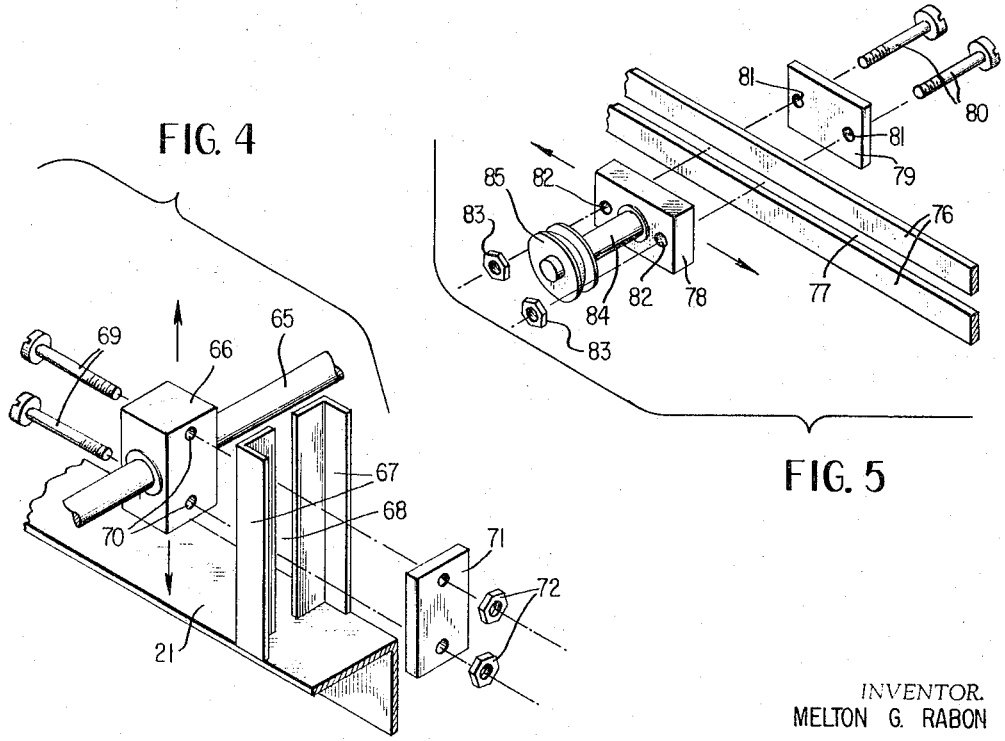
FIG. 5
INVENTOR.
MELTON G. RABON
BY
B.P. Fishburn, Jr.
ATTORNEY Feb. 28, 1967   M. G. RABON   3,306,325
MACHINE FOR PROCESSING WOODEN PIPE RESTS AND THE LIKE
Filed July 9, 1964   4 Sheets-Sheet 4
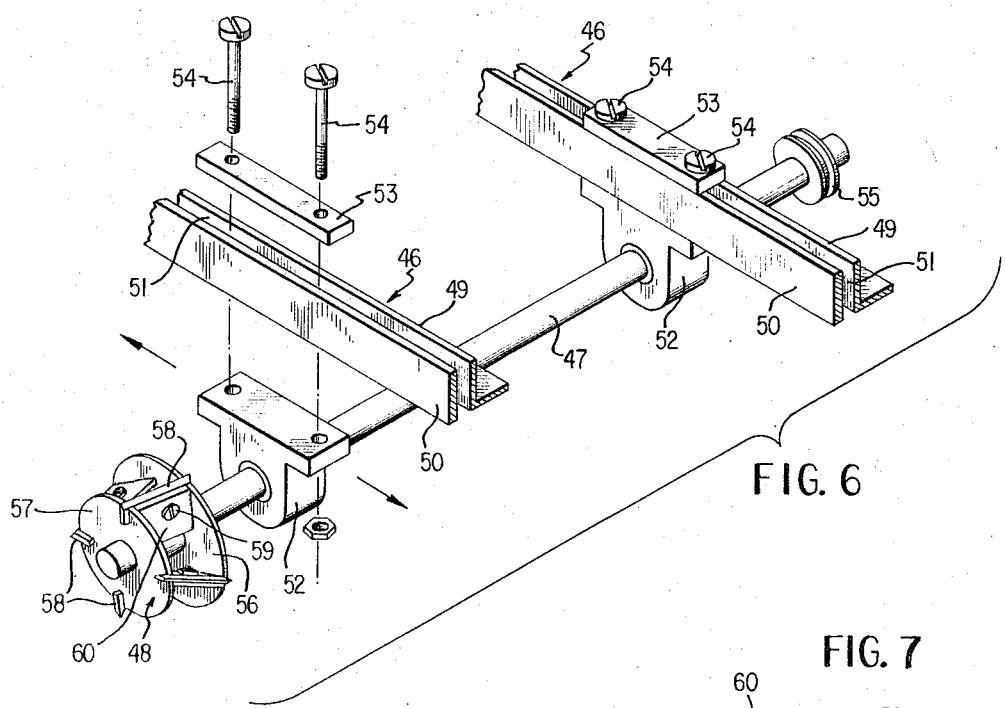
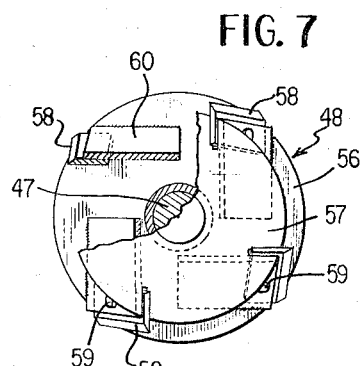
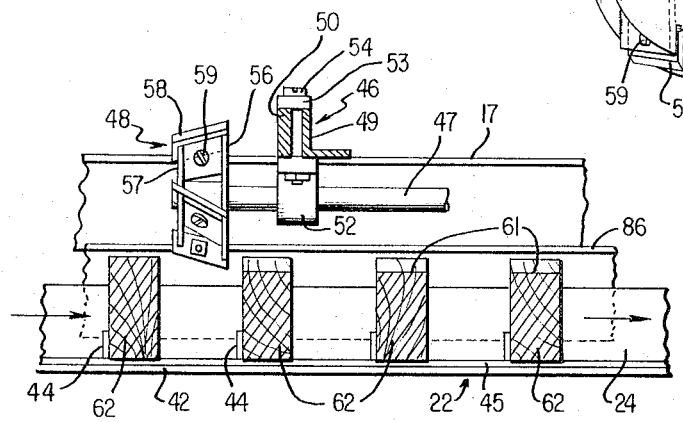
INVENTOR.
MELTON G. RABON
BY
B. P. Fishburn, Jr.
ATTORNEY () # United States Patent Office 3,306,325
Patented Feb. 28, 1967

3,306,325
MACHINE FOR PROCESSING WOODEN PIPE
RESTS AND THE LIKE
Melton G. Rabon, Rte. 1, Columbia, S.C. 29203
Filed July 9, 1964, Ser. No. 381,361
12 Claims. (Cl. 144—133)

This invention relates to a machine for working wood or like material and more particularly to a machine for forming recesses in lumber employed as rests for stacked pipe or the like.

Terra cotta pipe and the like is subject to cracking and breaking and must be handled carefully during storage and transportation. It is customary to stack this pipe utilizing recessed lumber between the layers of pipe to evenly space and support the same. Cheap lumber and scrap lumber may be employed. The purpose of this invention is to provide a machine for expeditiously and efficiently recessing the lumber employed for the above purpose. The machine has features of adjustability allowing it to process lumber of various sizes or heights and to provide recesses in one or both longitudinal edges thereof. The number of recesses and the spacing of recesses may also be varied. The machine is rugged and durable and can be adjusted and operated by one attendant to produce the pipe rests or spacers very rapidly and with uniformity.

Other objects and advantages of the invention will be apparent during the course of the following detailed description.

Figure 1:
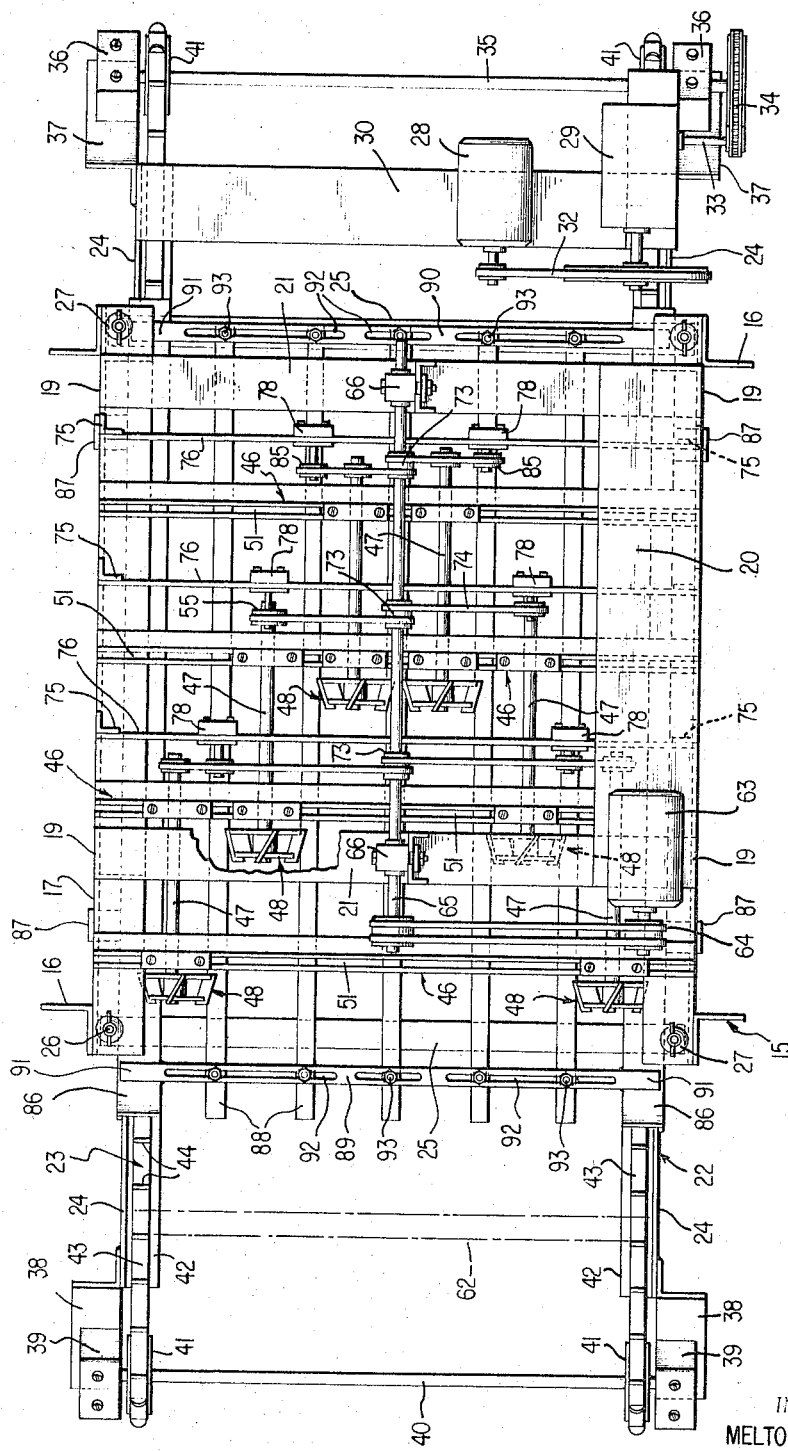
Figure 2:
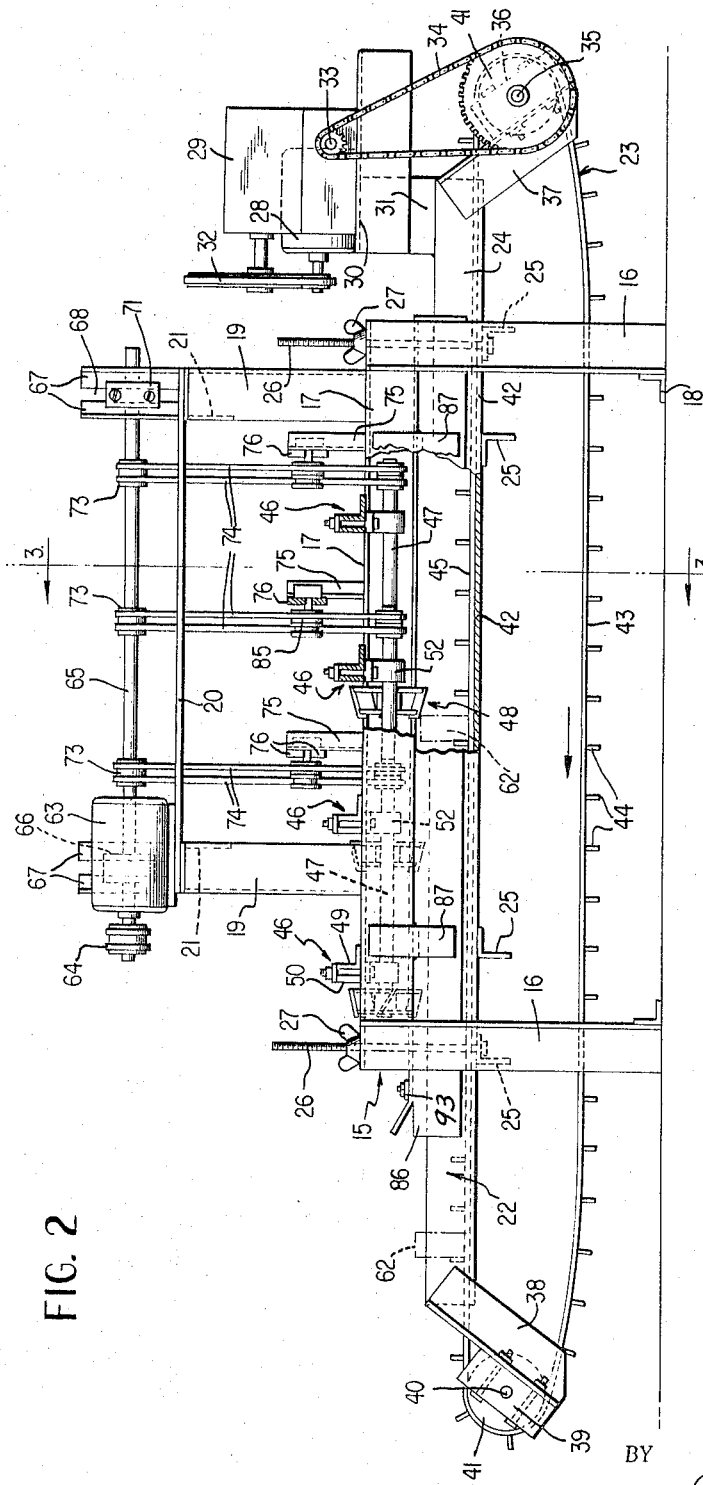
Figure 9:
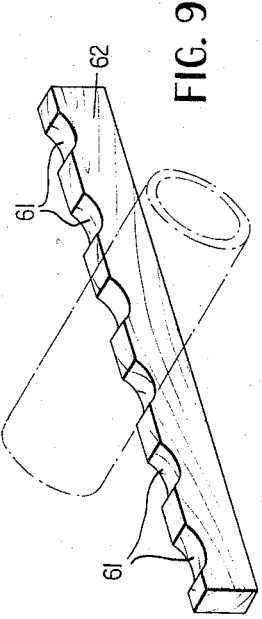

In the accompanying drawings forming a part of this application and in which like numerals are employed to designate like parts throughout the same, FIGURE 1 is a plan view of a woodworking machine embodying the invention, FIGURE 2 is a side elevation thereof, partly in section and partly broken away, FIGURE 3 is a transverse vertical section taken on line 3—3 of FIGURE 2, FIGURE 4 is a fragmentary exploded perspective view of a jack shaft and adjustable supporting means therefor, FIGURE 5 is a similar fragmentary exploded perspective view of an idler or belt tensioning pulley and adjustable supporting means therefor, FIGURE 6 is a similar fragmentary exploded perspective view of a cutter head and adjustable supporting means therefor, FIGURE 7 is an enlarged end elevation of a cutter head partly in section and partly broken away, FIGURE 8 is an enlarged fragmentary side elevational view of a cutter head and associated parts, partly in section, and showing the relation of the cutter head to work elements being processed in the machine, and FIGURE 9 is a perspective view of a work unit produced by the machine.

In the drawings, wherein for the purpose of illustration is shown a preferred embodiment of the invention, the numeral 15 designates a rigid support frame including corner vertical legs 16 and horizontal longitudinal bars 17 rigidly interconnecting the tops of the legs 16. The legs 16 are suitably braced at their bottoms by horizontal brace bars 18.

Vertical posts 19 are rigidly mounted upon the bars 17 and rise thereabove, and the tops of one pair of posts 19 are rigidly connected with a horizontal longitudinal support plate 20 along one side of the machine. The tops of the posts 19 are rigidly interconnected transversely by additional horizontal frame bars or beams 21, as shown in the drawings. The main frame of the machine thus far described is of rigid integral construction and may be formed by welding, if desired.

The machine embodies a vertically adjustable bed 22 for a work conveyer means 23. The bed 22 includes parallel longitudinal angle bars 24 arranged inwardly of the legs 16 and below the frame bars 17 and resting upon and suitably rigidly secured to transverse rigid horizontal angle bars 25. The several bars 24 and 25 constitute a rigid bed unit which may be constructed by welding. The entire bed 22 is suspended adjustably upon the main frame of the machine by means of vertical screw-threaded rods 26 adjacent the corner legs 16 and having their lower ends rigid with an adjacent pair of the transverse bars 25. The screw-threaded rods 26 carry adjusting nuts 27, resting upon the tops of frame bars 17 and these nuts are turned to raise and lower the entire machine bed 22 and to level the bed.

A conveyer drive unit in the form of an electric motor 28 and reduction gearing 29 is mounted upon a somewhat elevated support member 30, in turn carried by short legs 31 rigid with the angle bars 24, FIGURE 2. The motor 28 is connected with the reduction gearing 29 by a belt drive 32, as shown. An output shaft 33 from the reduction gearing 29 operates a chain drive 34 having one sprocket gear thereof secured to a horizontal transverse conveyer drive shaft 35, journaled for rotation on suitable bearings 36, mounted upon inclined bars 37 rigid with the bed 22. Therefore, the entire conveyer drive means or unit is bodily mounted upon the bed 22 and moves vertically with the bed when the bed is adjusted. The opposite end of the bed carries similar inclined arms 38, upon which are mounted rigidly bearings 39 for a second horizontal transverse conveyer shaft 40.

The driving and driven conveyer shafts 35 and 40 carry suitable sprocket gears 41 inwardly of the bearings 39 and 36 and in line with the horizontal flanges 42 of angle bars 24. Work drive chains 43 having equidistantly spaced cleats 44 engage the sprocket wheels 41 and are driven thereby longitudinally of the machine. The cleats 44 of the two chains are in lateral alignment. The two chains are driven in unison when the motor 28 is in operation. Upper runs 45 of the chains travel slidably over the flanges 42 as shown in FIGURES 2 and 3.

The machine further embodies a novel arrangement of cutter heads to recess lumber while the lumber is conveyed through the machine longitudinally. More particularly, the machine comprises longitudinally spaced parallel transverse supporting and adjusting units 46 for the longitudinal horizontal spindles or shafts 47 of cutter heads 48 mounted upon the shafts 47 to turn therewith. Each unit 46, FIGURE 6, includes a pair of closely spaced parallel bars 49 and 50 having a slot 51 between them, said bars being welded or otherwise rigidly secured at their opposite ends to the frame members 17, FIGURES 2 and 3. The shaft 47 of each cutter head 48 is journaled for rotation in a pair of spaced bearings 52 secured adjustably and dependingly to the units 46 by means of clamp plates 53 and screws 54 or the like. It will be understood that the shafts 47 with their bearings 52 may be adjusted laterally of the machine to various locations within the slots 51. Each shaft 47 carries near its rear end a drive sheave 55 suitably rigidly secured thereto. As shown in FIGURE 1, the several shafts 47 for cutter heads 48 are of almost equal length.

Each cutter head 48 consists of a pair of axially spaced discs 56 and 57, the forward disc 57 being smaller than the disc 56. Circumferentially spaced cutter blades 58, preferably four in number on each head, are suitably clamped at 59 to generally radial webs or plates 60 extending between the discs 56 and 57 and welded thereto. As clearly shown in FIGURES 6–8, the several blades 58 are set diagonally to the axis of the shaft 47 and the several blades are also inclined downwardly and forwardly so as to converge forwardly toward the axis of the shaft 47. The several blades 58 therefore constitute on each head a forwardly tapering rotary cutter whose individual blades are set at angles. The outer or radial edges of the blades are their only cutting edges and the forward ends of the blades which project somewhat beyond the disc 57 do not cut.

As should now be clearly understandable in light of the foregoing description, the cutter heads 48 and their shafts 47, FIGURES 1, 2 and 3, may be arranged in laterally aligned pairs with respect to the conveyer chains 43 and with each such pair staggered or spaced longitudinally of the machine as best shown in FIGURE 1. The individual shafts 47 and their bearings 52 are laterally adjustable within the slots 51 to any required location, and they may be locked in the selected adjusted position by the clamp screws 54 and associated parts. As shown in FIGURE 2, a first or forward pair of the cutter heads 48 may be mounted close to and above the conveyer chains 43. A second pair of cutter heads 48 may be mounted somewhat rearwardly of the leading cutter heads and laterally inwardly thereof, and finally, a third pair of cutter heads 48 may be mounted rearwardly of the intermediate pair and inwardly thereof in rather closely spaced relation. In the arrangement shown in the drawings, the six cutter heads 48 and their shafts are adjusted to be equidistantly spaced apart laterally for producing six equidistantly spaced arcuate recesses 61 in the top of each piece of lumber or work unit 62, FIGURE 9. The shafts 47 and the cutter heads may be adjusted laterally to any desired spacing by virtue of the units 46 having the slots 51, etc. The arrangement also provides for properly aligning each set of bearings 52, FIGURE 6. As shown in FIGURE 1, the machine is constructed to accommodate six of the cutter heads 48. In this figure, it can also accommodate two, three, four or even five cutter heads in any desired spacing, if preferred. By providing a sufficiently long main frame and a sufficient number of the units 46, the machine can embody almost any practical number of the cutter heads in almost any desired space relation. In practice, it is contemplated building the machine to accommodate up to eight cutter heads. As shown in the drawings, FIGURE 3, all of the shafts 47 and cutter heads are at the same elevation regardless of their lateral spacing so that the recesses 61 in the lumber will be uniform and of equal depth.

The machine embodies separate and independent drive means for the several shafts 47 and cutter heads 48 so that the latter may turn in unison to form the recesses 61 in the work regardless of the lateral positioning of the cutter heads between allowable limits. This drive means comprises a suitable motor 63 on the plate 20 operating a belt drive 64, connected with and driving an overhead longitudinal jack shaft 65, arranged at the transverse center of the machine and above the frame members 21, as shown. The jack shaft 65 is journaled in bearing blocks 66, FIGURE 4, near the forward and rear ends of the jack shaft and above the members 21. Near their centers, the members 21 have upstanding angle posts 67 welded thereto defining slots 68 for clamp bolts 69. The bearing blocks 66 receive the bolts 69 at 70 and the bearing blocks engage corresponding flanges of angle posts 67, as shown. Clamp plates 71 clampingly engage the opposite sides of the posts and the bolts 69 carry nuts 72 which bear against the outer faces of the plates 71. By virtue of this arrangement shown in detail in FIGURE 4, the jack shaft 65 may be adjusted vertically and leveled and locked in the selected adjusted position. The jack shaft 65 is not adjustable laterally and the cutter shafts 47 are not adjustable vertically.

The jack shaft 65 is equipped between its bearings with suitable pulleys 73 for inclined endless belts 74, interconnecting the jack shaft with the several sheaves 55 of cutter shafts 47.

Means are provided to tension or against the slack in the several belts 74 to accommodate the various adjustments of the shafts 47 and 65 and the various arrangements of the cutter heads. This means comprises additional pairs of short upstanding posts 75 rising from and rigid with the frame members 17, and horizontal transverse vertically spaced bars 76 carried by each pair of posts 75 and defining between them horizontal transverse adjustment slots 77, FIGURE 5.

Associated with each slot 77 is a pair of bearing blocks 78 and clamp plates 79 and clamp bolts 80 for engagement through openings 81 and 82 of the clamp plates and bearing blocks, respectively. The bolts 80 pass through the slots 77 and carry clamping nuts 83, as shown. Each bearing block 78 carries a shaft extension 84 having a preferably ball bearing idler pulley 85 journaled thereon. One such pulley 85 is provided for engagement with each belt 74 as shown clearly in FIGURES 1, 2 and 3 and the lateral adjustability of the pulleys 85 and associated parts on the bars 76 allows for proper tensioning of the individual belts 74 under all conditions of adjustment.

Adjustable means is also provided in the machine to stabilize each lumber unit 62 during the cutting operation so that the lumber will not tilt or fall over on the conveyor chains. Such means may be in the form of a pair of horizontal longitudinal guide angles 86 extending for the entire length of the machine between the legs 16 and in the region of the several cutter heads 48. The guide elements 86 are fixedly suspended from the main frame bars 17 through brackets 87, welded or otherwise rigidly secured to the elements 17 and 86. As shown in FIGURE 3, the guide angles 86 interfit with the angle bars 42 and the latter are vertically adjustable bodily with the machine bed 22 as previously stated. The top horizontal flanges of the elements 86 overlie the opposite end portions of the work 62 in close proximity thereto to guide and stabilize the work during passage through the machine. The relationship of the guide angles 86 and bars 24 to the work 62 is also shown clearly in FIGURE 8.

To further engage and stabilize the work 62 in the machine, a plurality of laterally spaced parallel longitudinal slats 88 are carried by a single pair of horizontal transverse bars 89 and 90 near the opposite ends of guide angles 86 and welded or otherwise rigidly secured thereto at 91. The bars 90 and 89 are thus rigid with the fixed guide angles 86. If preferred, the bars 89 and 90 may be detachably mounted upon the guide angles 86 so as to be removable therefrom. The several slats 88 are readily detachable from the supporting bars 89 and 90 and also laterally adjustable thereon through the medium of slots 92 and connecting bolt means 93, as shown clearly in FIGURE 1. When the machine bed 22 and bars 24 are adjusted vertically to accommodate work units or lumber of a given vertical height or thickness, a slight clearance is provided between the upper edges of the work 62 and the slats 88 and the lower faces of the guide angles 86, FIGURES 3 and 8. In this connection, the height or thickness of the lumber being processed usually varies between two inches and four inches, approximately. In practice, 2″ by 2″ lumber and 4″ by 2″ lumber is employed. By means of the screwthreaded rods 26 and nuts 27, the machine bed 22 has a considerable range of adjustment to accommodate various lumber thicknesses. The thicker work units or lumber are generally used to support the lowermost layer of pipe adjacent the ground in a stack of pipe. Successive upper layers are supported on the thinner lumber units recessed in accordance with the invention.

The pipe to be supported in the stacks may vary in diameter between about four and fifteen inches, and the machine is fully capable of recessing the work 62 in a proper manner to accommodate the various pipe sizes. When larger diameter pipe is to be accommodated, a lesser number of the recesses 61 formed on a larger radius must be provided in the work 62. The way to accomplish this is simply to employ larger diameter cutter heads 48 on a lesser number of the shafts 47 which are readily adjustable laterally and also removable from the machine along with their bearings. That is to say, the machine can be conditioned prior to operation to contain the desired number of cutter heads having the desired diameter so as to process the work 62 with a few large diameter recesses 61 spaced a greater distance apart or a greater number of smaller diameter recesses spaced a lesser distance apart. The machine is extremely flexible in its capabilities in this regard. Also, the work 62 may be recessed in both its top and bottom faces, if required, by merely inverting the work after one passage through the machine and then passing it through again with its previously-recessed edge downwardly. The slats 88 which stabilize the work during engagement with the cutter heads may be adjusted laterally in the necessary manner to accommodate various numbers and sizes of cutter heads and when necessary some of the slats 88 can be removed to allow the desired spacing of cutter heads without interference with the slats. It is believed that the capabilities of the machine in this area are now readily understandable without further discussion.

In use or operation, scrap lumber or the like is selected to make up a multiplicity of the work units 62 of uniform thickness for a given run through the machine. The machine bed 22 and the guide means 86 are adjusted to the proper level to accommodate the given work thickness and to position the work on the conveyer 23 at the proper elevation for cutting by the tapered heads 48.

Likewise, the desired number of cutting heads 48 are installed on the machine and adjusted laterally in the required manner and locked in the selected adjusted positions by the means already described. The several belt tensioning or slack take-up pulleys 85 are similarly adjusted laterally in the slots 77 and locked.

With the machine thus adjusted for a particular run of work, the two motors 28 and 64 are started and this causes the conveyer 23 composed of the two chains 43 to run in the direction of the arrow, FIGURE 2, and also causes the several shafts 47 to rotate the cutter heads 48 in the proper direction for cutting the recesses 61 in the lumber. An attendant near the input end of the machine, which is the left-hand end in FIGURES 1 and 2, simply places the work units 62 on the conveyer between pairs of the cleats 44, as shown in broken lines in FIGURES 1 and 2. A work unit may be placed between each pair of cleats. The conveyer chains slowly carry the work units 62 toward the several laterally aligned and longitudinally spaced pairs of cuter heads 48. By virtue of the arrangement of cutter heads shown and described, only one pair engages a work unit 62 at one time and this of course reduces the force or pressure on the work and renders it easier to guide through the machine and minimizes the power required. The arrangement of cutter heads in longitudinally staggered pairs also allows closer lateral spacing of the recesses 61 without any two cutter heads interfering with each other. By the time that the work units 62 pass the several pairs of cutter heads 48, FIGURE 1, they are fully processed with all of the recesses 61 in their upper edges as shown in FIGURE 9. The fully processed work is then carried to the discharge end of the conveyer which is the right-hand end of FIGURES 1 and 2 and the work may either be lifted from the conveyer or may be discharged in any suitable manner. An extremely high number of work units may be thus processed in a continuous and rapid manner with minimum cost and labor.

FIGURE 8 shows somewhat diagrammatically the passage of a plurality of work or lumber units through the machine with relation to one of the cutter heads 48. It is believed that this operation will now be obvious to anyone skilled in the art, without the necessity for any further description of the machine.

It might be added that not only can units 62 of varying height or thickness be processed in the machine, but additionally, the units 62 or lumber may vary quite considerably in width axially or longitudinally of the recesses 61 without interference with the proper operation of the machine.

FIGURE 9 shows in broken lines a section of terra cotta pipe or the like resting in one of the recesses 61. The purpose of the invention should now be readily apparent to those skilled in the art.

It is to be understood that the form of the invention herewith shown and described is to be taken as a preferred example of the same, and that various changes in the shape, size and arrangement of parts may be resorted to, without departing from the spirit of the invention or scope of the subjoined claims.

Having thus described my invention, I claim:

1. A machine for processing wooden pipe rests comprising a machine main frame including a table-like support having legs and an overhead frame portion, a machine bed suspended from the table-like support, means interconnecting the bed and support and operable to adjust the bed vertically, a cleated conveyer structure on said bed including power means to drive the conveyer structure, a plurality of laterally spaced and longitudinally staggered rotary cutter heads on said support having parallel longitudinal spindles, means carrying the spindles and rendering them individually laterally adjustable on said support and lockable in selected adjusted positions, an overhead longitudinal jack shaft on the overhead frame portion, power means connected with the jack shaft to rotate the same, plural endless belt means interconnecting the jack shaft and said spindles to drive the latter in unison, and laterally adjustable means on said support engaging said belt means to properly tension the belt means in all laterally adjusted positions of the spindles.

2. A machine for processing wooden pipe rests or spacers comprising a main frame, a vertically adjustable underslung horizontal bed on the main frame, power-operated endless cleated conveyer means on said bed to be raised and lowered bodily therewith relative to the main frame, a plurality of spaced parallel longitudinal cutter shafts journaled for rotation on the main frame in a common horizontal plane and at a fixed elevation, means carrying said shafts and rendering them individually laterally adjustable on the main frame, tapered cutter heads on said shafts disposed in laterally aligned pairs and with pairs of said heads staggered longitudinally, an overhead drive means for said shafts on the main frame including a single jack shaft common to said shafts and adjustable tension belt transmission means interconnecting said jack shaft and said shafts.

3. The invention as defined by claim 2, and wherein said belt transmission means includes a laterally adjustable idler on the main frame for each individual belt.

4. A woodworking machine comprising a main frame, power-operated conveyer means on the main frame to feed work units longitudinally of the main frame, screw-threaded suspension means for the conveyer means operable to raise and lower the conveyer means bodily relative to the main frame, a plurality of horizontal longitudinal axis rotary cutters on the main frame at a fixed elevation and in a common horizontal plane relative to and above the conveyer means, an overhead jack shaft on the main frame substantially at the transverse center thereof and parallel to the axes of said cutters, belts individual to the cutters and connected therewith and also connected with the jack shaft, and laterally adjustable slack take-up means for the belts on the main frame.

5. The invention as defined by claim 4, and wherein the belt slack take-up means comprises idler pulleys individual to and engaging the belts, transverse horizontal support track means on the main frame for the idler pulleys, and clamp means interconnecting the pulleys and support track means for releasably locking the pulleys in individual selected adjusted positions.

6. The invention as defined by claim 4, and a rotary spindle carrying each rotary cutter, bearing means supporting each spindle, transverse horizontal support track means for the bearing means of each spindle, and clamp means interconnecting the bearing means and support track means for releasably locking each spindle and cutter in the selected laterally adjusted position.

7. The invention as defined by claim 6, and wherein each cutter on each spindle includes a head having a plurality of circumferentially spaced forwardly converging and diagonally set cutter blades rendering the cutter forwardly tapering.

8. A machine for processing lumber to produce pipe rests comprising a main support frame, a machine bed suspended from the main support frame and being vertically adjustable thereon, a lumber conveyer on the machine bed including endless cleated conveyer elements having upper runs, guide bars on the machine bed and engaging the upper runs and being movable with the machine bed, coacting fixed guide bars on the main frame having interfitting engagement with the guide bars of the bed and adapted to engage and stabilize end portions of the lumber during passage through the machine, a plurality of horizontal longitudinal axis rotary cutters mounted for independent lateral adjustment on the main frame above said bed, and common power transmission means for said cutters mounted on the main frame.

9. The invention as defined by claim 8, and a plurality of independently laterally adjustable horizontal guide slats on the fixed guide bars of the main frame and overlying the lumber to further stabilize it during passage through the machine.

10. The invention as defined by claim 9, and wherein said slats extend longitudinally of the machine, a pair of cross bars on the fixed guide bars of the main frame and crossing end portions of the slats and having adjusting slots therein, and bolt means interconnecting the slats and said slotted bars.

11. A machine for processing scrap lumber to pipe rests or spacers comprising a machine main frame, a lumber conveyer vertically adjustably mounted on said main frame, guide means for the lumber on said conveyer and main frame to stabilize the lumber during passage through the machine, plural horizontal longitudinal axis rotary cutters on the main frame, each cutter being conically tapered and including a plurality of circumferentially spaced cutter blades arranged diagonally of the cutter rotational axis, bearing means for the cutters and being independently laterally adjustable on the main frame, belt drive means for the cutters on the main frame, and means to adjust slack in the belts of the belt drive means to compensate for various lateral positions of the cutters.

12. A machine for processing scrap lumber into pipe rests comprising a machine main frame, a lumber conveyer vertically adjustably mounted on the main frame, plural horizontal longitudinal axis rotary cutters on the main frame above said conveyer, individual laterally adjustable bearing means for the cutters and supporting the cutters on said main frame for independent lateral adjustment, overhead drive means for the cutters on the main frame including an overhead longitudinal drive shaft, individual transmission belts for the cutters connected with said drive shaft and driven thereby, and individually laterally adjustable slack take-up devices for the transmission belts on the main frame include transverse guides so that each belt may be adjusted to compensate for lateral adjustment of its associated cutter.

References Cited by the Examiner

UNITED STATES PATENTS

| 1,159,795 | 11/1915 | Purdy et al. | 144—133 |
| 1,672,652 | 6/1928 | Mansfield | 144—133 |
| 2,705,031 | 3/1955 | Fowler | 144—133 |

FOREIGN PATENTS

| 2,874 | 11/1864 | Great Britain. |

DONALD R. SCHRAN, *Primary Examiner.*